United States Patent [19]
Lang-Ree et al.

[11] 3,991,665
[45] Nov. 16, 1976

[54] MEATBALL COOKER

[75] Inventors: Nils Lang-Ree, Los Altos, Calif.; Kurt Nilsson, Bjuv, Sweden; Goeran Hemborg, Aengelholm, Sweden; Winje Green, Helsingborg, Sweden

[73] Assignee: N.P.I. Corporation, Burlingame, Calif.

[22] Filed: June 23, 1975

[21] Appl. No.: 589,700

[52] U.S. Cl. ................................. 99/441; 99/423
[51] Int. Cl.² ........................................... A47J 37/04
[58] Field of Search ............ 99/423, 339, 340, 353, 99/360, 373, 441, 443; 198/34 A, 107, 127, 213

[56] References Cited
UNITED STATES PATENTS

| | | | |
|---|---|---|---|
| 1,933,404 | 10/1933 | Allen et al. | 198/213 |
| 2,020,446 | 11/1935 | Weisel | 99/441 X |
| 2,185,979 | 1/1940 | Dumas | 99/441 X |
| 2,244,670 | 6/1941 | Benedict | 99/339 |
| 2,515,404 | 7/1950 | Grosvenor | 198/34 A X |
| 3,283,895 | 11/1966 | Rollins | 198/213 X |
| 3,340,794 | 9/1967 | Giuliano | 99/443 C |
| 3,472,156 | 10/1969 | Bardeau et al. | 99/423 |

*Primary Examiner*—Edward L. Roberts
*Assistant Examiner*—Arthur O. Henderson
*Attorney, Agent, or Firm*—Lothrop & West

[57] ABSTRACT

A meatball cooker has a frame on which a pair of generally cylindrical rollers are mounted alongside each other to extend horizontally with their axes parallel to each other. At least one of the rollers, and preferably both, includes a helical groove concentric with the respective axis, the groove being of a character to engage the customary meatball. The rollers are heated internally, and preferably externally also, and are rotated relative to each other about their respective axes and preferably in the same directions with the helical grooves of the same hand to advance and turn the meatballs. There is an enclosure around the rollers and a grease pan beneath. Conveniently there is a feeding chute for introducing the meatballs to the device and a receiving chute for carrying away processed meatballs.

3 Claims, 4 Drawing Figures

MEATBALL COOKER

In the increasing industry of preparing foodstuffs away from home and particularly in connection with so-called "fast food" types of operation, there is a need for a way of preparing meatballs in a satisfactory, expeditious and improved fashion. A typical meatball is comprised of a mixture of finely divided meat and various and sundry other materials generally compacted by hand into an approximately spherical shape about thirty millimeters in diameter. There is customarily some variation in the size and shape of the meatballs and there is consequently some variation in their cooking unless they are individually observed, which is usually not possible in quantity production. It is often the case that meatballs are prepared by or in association with substantial liquid.

It is therefore an object of the invention to provide a meatball cooker that can handle various meatballs, but preferably of generally uniform size and shape, in a generally uniform manner.

Another object of the invention is to provide a meatball cooker that can operate substantially dry, that is, in the absence of added moisture.

Another object of the invention is to provide a meatball cooker that can receive meatballs and process them automatically.

Another object of the invention is to provide a meatball cooker in which heat is appropriately applied to the meatballs during the various stages of the cooking process.

A further object of the invention is to provide a compact, simple and economical machine for the quantity cooking of meatballs.

A further object of the invention is in general to improve meatball cooking devices.

Other objects, together with the foregoing, are attained in the embodiments of the invention described in the accompanying description and illustrated in the accompanying drawing, in which.

Figure 1:
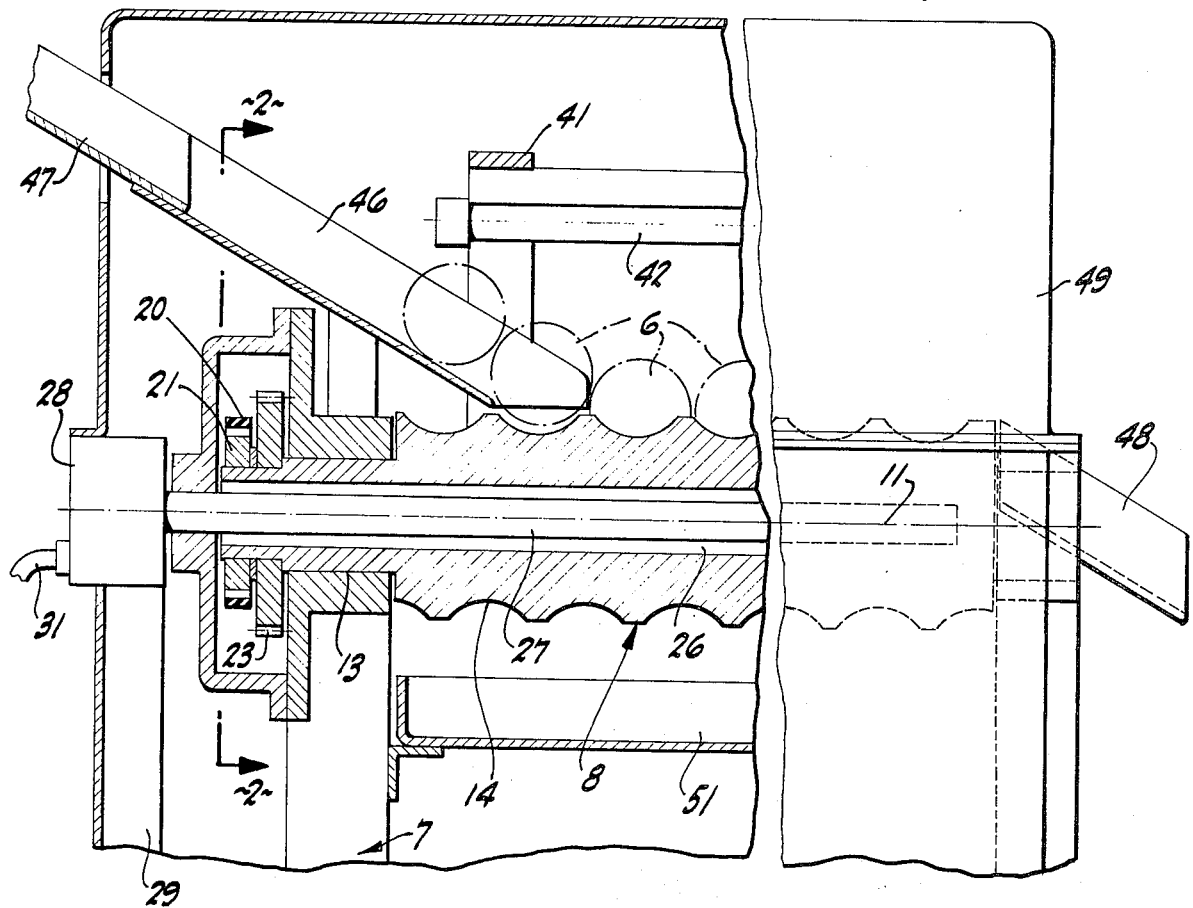
FIG. 1 is an elevation, with various parts removed, of one form of meatball cooker, various portions being in cross-section on a vertical plane.
Figure 2:
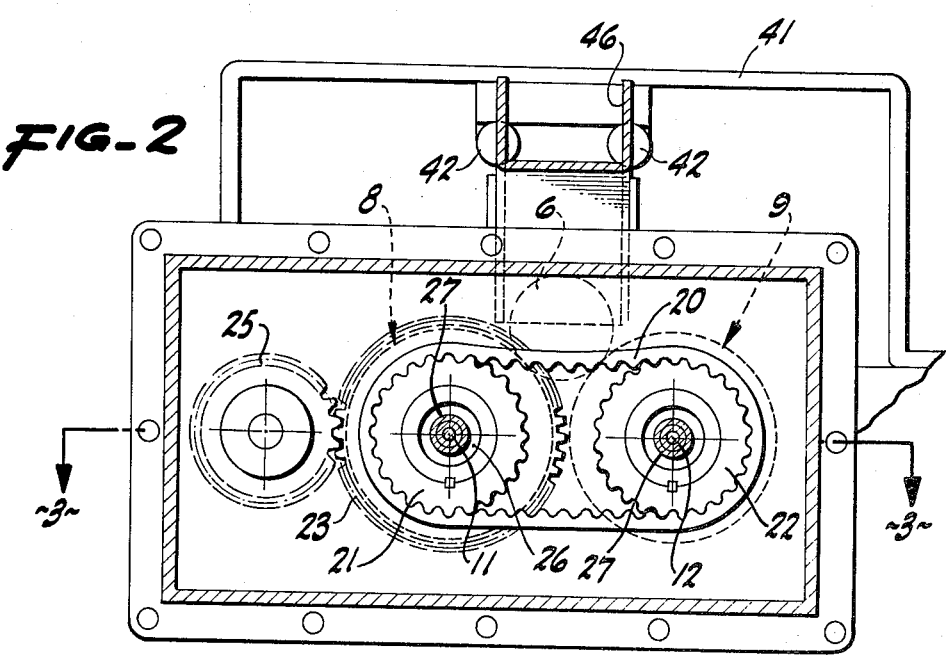
FIG. 2 is a cross-section, the plane of which is indicated by the line 2—2 of FIG. 1, and with various portions broken away or removed to simplify the figure.

The meatball cooker pursuant to the invention is particularly arranged for the cooking of one or more and preferably of quite large quantities of meatballs, each of which is generally considered as a sphere having a diameter of approximately thirty millimeters. The actual meatballs vary from the true spherical shape and from the precise dimension but usual variations are well accommodated by the present machine.

The machine includes a supporting frame 7 of any appropriate construction arranged in this instance to support a pair of rollers 8 and 9. These rollers are generally of an elongated, cylindrical nature and each has its own axis, such as 11 and 12. The rollers are carried in bearing portions 13 arranged in the frame 7 so that the axes 11 and 12 are in the same horizontal plane and are parallel to or alongside each other. The rollers are supported similarly at their opposite ends in comparable structures, not shown. Each of the rollers is particularly configured on its exterior. Arranged on one roller is a helical groove 14 having an arcuate cross-section of a dimension that is substantially the same as that of the meatballs being handled; for example, a radius of approximately 15 millimeters. The pitch of the groove on one roller is about 40 millimeters, as an example, and has a particular handedness, for example, right handed. When the roller is rotated in one, selected direction the groove apparently progresses from the entrance of the machine toward the exit therefrom.

The other roller 9 may be entirely cylindrical without a groove but usually the other roller 9 has a similar groove 16 of the same cross-sectional shape and of the same pitch and register as the groove 14 and of the same hand, since it is intended that the roller 9 rotate in the same direction as that of the roller 8.

The roller axes 11 and 12 are spaced apart a variable distance, about 75 millimeters, so that there is adequate clearance between the two rollers, not only in the groove portions but also in the circular-cylindrical portions thereof. But there is only so much clearance as will permit a meatball 6 resting in the grooves on the respective rollers to be held well above the horizontal plane containing their axes 11 and 12. There is no path for anything except small debris to fall between the two rollers. All appropriately sized meatballs are retained in the respective grooves above the roller center lines.

Each of the rollers extends from it bearing 13 and carries one of a pair of driven cogs 21 and 22 engaged by a cog belt 20. The cogs 21 and 22 are positioned with respect to each other and to the belt so that the grooves 14 and 16 are in registry with each other and afford a number of somewhat interrupted but effective spherically shaped beds or cups for locating and partially confining the meatballs. The cogs and belt also ensure that when one roller turns in one direction the other roller turns in the same direction. The cog gear 21 is itself propelled by a driven gear 23 (FIG. 3) engaged by a driving gear 25 turned by a motor 24 on the frame. Whenever the motor is energized the rollers are appropriately driven at the same speed and in the same direction.

In order to take care of the cooking action, the rollers are heated. Each of the rollers is preferably hollow to define an interior chamber 26 extending generally therethrough and concentric with the axis of the roller. Within each such chamber there is axially disposed a stationary electric heating element 27. The heating element may extend for the entire length of the roller, but it is preferred in most instances to terminate the heating element somewhat short of the discharge end of the rollers, since at the far end it is not necessary, usually, to continue to add heat. The heating element 27 is cantilevered from a mounting box 28 on a bracket 29 forming part of the frame 7. An electrical connection 31 supplies power to the heating element 27, which by radiation heats each roller from within to a temperature sufficient to effectuate all or any chosen fraction of the cooking of the meatballs.

Figure 3:
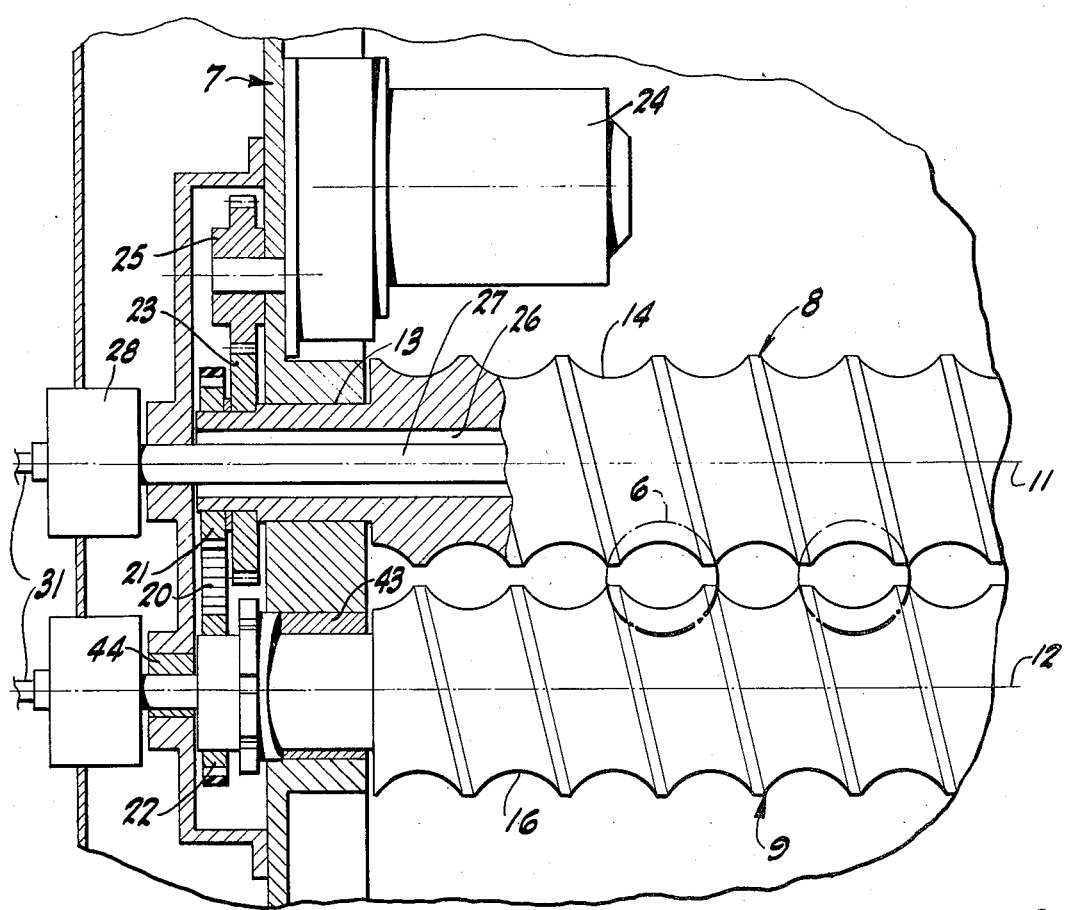
FIG. 3 is a cross-section, the plane of which is indicated by the line 3—3 of FIG. 2, with certain portions broken away or removed to simplify the figure.
Figure 4:
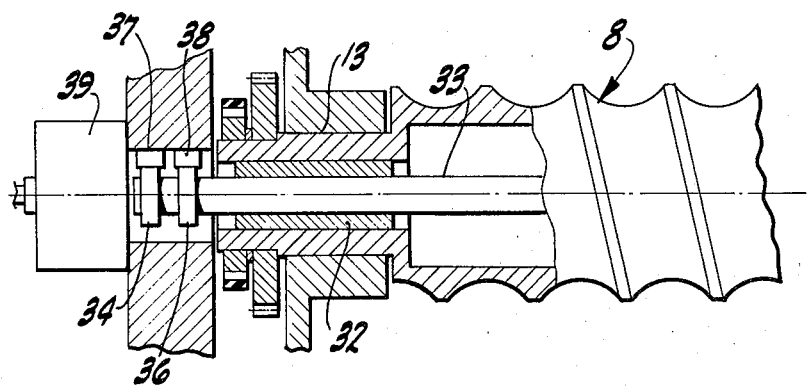
FIG. 4 is a view comparable to FIG. 3, showing a modified form of electrical connection.

If the cantilever construction of FIGS. 1 and 3 is not desired then, as shown in FIG. 4, there is an alternative arrangement in which a roller such as 8, comparable to the rollers as previously described, contains a bushing 32 supporting a heating element 33 within the roller chamber and for rotation in unison with the roller. The heating element 33 at its outboard end carries a pair of slip rings 34 and 36 appropriately connected to the interior wiring of the heating element and themselves contacting brushes 37 and 38 joined by conductors (not shown) to a mounting box 39 on the frame 7 and supplied with power in the customary way.

The machine is not only provided with interior heating for the rollers but in many cases, although optionally, the rollers are externally heated. In such a case there is an extension 41 on the frame which carries one or more infrared heating elements 42 positioned to heat the rollers from the outside and also to heat any meatballs thereon.

Means are provided for feeding meatballs to the grooves in the rollers. In the present instance this means is an inclined trough 46, or chute, mounted on the frame and receiving meatballs in succession from a supply duct 47. The meatballs travel in single file down the duct 47 into the chute 46 and from there travel by gravity into the interior of the device, the bottom one resting on the rollers until it is able to drop by gravity into and be propelled by engagement with the sides of the two registering or facing grooves on the respective rollers 8 and 9.

The meatballs are warmed as they advance along the length of the machine by the rotation of the rollers. Each meatball, being supported on surfaces moving relative thereto, is continually being turned and rotated in all directions as it advances to expose all parts of the surface from time to time and afford an unusually uniform shaping, heating and cooking operation. The meatballs reside within the machine until such time as they are appropriately cooked. At the far end, the cooked meatballs fall by gravity off of the end of the roller grooves and drop into a discharge chute 48 leading to a point for further handling.

To afford a variable grip on the meatballs for firm forming engagement and enhanced heat transfer from the rollers, at least one of the rollers is mounted in eccentric bushings 43 and 44 so that, by adjustment of the bushings, the roller axis can be shifted toward and away from the other roller axis. In this way any desired vertical location of the meatball centers with respect to the roller axes and any desired amount of wedge-like, frictional gripping of the meatballs by the rollers can be arranged. The meatballs are thus not only heated by conduction with any desired degree of conductance heat transfer but are also smoothed and shaped as they turn and roll along the rollers.

The operation is isolated generally from its surroundings by a removable hood 49 on the frame arranged to protect the interior of the machine and its contents. Since there is usually some liquid dripping from the meatballs as they are thawed from frozen and as they are cooked, the frame 7 carries a grease tray 51. This intercepts falling liquids and other debris and can periodically be removed for cleaning.

While in the present instance the machine has but one pair of rollers for handling a single file of meatballs, by duplication of the described parts one machine can advance a number of parallel files of meatballs progressing through the machine and being turned, shaped and oriented so that on all surfaces they are variously subjected to conducted and radiant cooking heat. In this way a superior, economical and approved product is provided.

What is claimed is:

1. A meatball cooker comprising a frame, a pair of generally cylindrical rollers each having an axis, means for mounting said rollers on said frame with said axes parallel and horizontal, means defining a helical groove concentric with said axis on at least one of said rollers, said groove having substantially the same arcuate cross-sectional contour as a portion of a substantially spherical meatball, means within said rollers for heating said rollers, and means for rotating said rollers about the respective ones of said axes.

2. A device as in claim 1 in which both of said rollers include means defining substantially identical helical grooves and in which said grooves are in registry and advance together.

3. A device as in claim 2 including means for changing the vertical location at which a spherical meatball rests on said rollers by moving said roller axes toward and away from each other into different set positions.

* * * * *